United States Patent [19]

Siegal

[11] 3,903,258

[45] Sept. 2, 1975

[54] ZIRCONIUM ALUMINUM COMPLEXES AND METHOD OF MAKING THE SAME

[75] Inventor: Bernard Siegal, Bedford, Mass.

[73] Assignee: The Gillette Company, Boston, Mass.

[22] Filed: Aug. 6, 1973

[21] Appl. No.: 386,160

[52] U.S. Cl. .............. 424/66; 423/463; 424/DIG. 5; 424/47; 424/68; 424/358
[51] Int. Cl.² .......................................... A61K 7/34
[58] Field of Search ........... 424/66, 47, 68; 423/463

[56] References Cited
UNITED STATES PATENTS

| | | | |
|---|---|---|---|
| 2,933,433 | 4/1960 | Teller | 424/68 |
| 3,009,771 | 11/1961 | Grote | 424/463 |
| 3,725,540 | 4/1973 | Wahl | 424/68 X |

FOREIGN PATENTS OR APPLICATIONS

| | | | |
|---|---|---|---|
| 237,094 | 1/1962 | Australia | 423/463 |
| 890,579 | 3/1962 | United Kingdom | 423/463 |
| 612,936 | 1/1961 | Canada | 423/463 |

*Primary Examiner*—Albert T. Meyers
*Assistant Examiner*—Dale R. Ore
*Attorney, Agent, or Firm*—Richard A. Wise; Oistein J. Bratlie; William M. Anderson

[57] ABSTRACT

The present invention is concerned with zirconium - aluminum complexes and processes for producing them. In general, the complexes are formed by reacting about 1 mole of zirconyl chloride ($ZrOCl_2$) with about 0.5 to 2 moles of aluminum hydroxide and then further complexing the resulting complex with about 0.25 to 6 moles of an aluminum chlorhydroxide.

12 Claims, No Drawings

ZIRCONIUM ALUMINUM COMPLEXES AND METHOD OF MAKING THE SAME

SUMMARY OF THE INVENTION

Zirconyl chloride has long been known to be a more effective antiperspirant than the aluminum chlorhydroxides which have been widely marketed. Due, however, to the acidity of zirconyl chloride which makes it somewhat irritating to the skin and harmful to clothing, it has not been extensively used. Various methods have been proposed for reducing its acidity by combining it with basic aluminum compounds alone or in combination with other materials such as ureas or amino acids, but none of these methods have proved completely successful. The present invention is concerned with providing aluminum - zirconium complexes (a) which can be relatively inexpensively produced; (b) which have acidities such as not to be harmful to skin or clothing; and (c) have anti-perspirant activity which is at least comparable to that of the aluminum - zirconium antiperspirant complexes presently marketed.

Generally, it has been found that the above objectives may be realized by a zirconium - aluminum complex which is formed by reacting about 1 mole of zirconyl chloride with about 0.5 to 2 moles and preferably 1 to 1.75 moles of aluminum hydroxide and then further complexing the resulting complex with about 0.25 to 6 moles and preferably 0.25 to 2 moles of an aluminum chlorhydroxide within the formula:

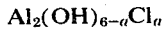

$$Al_2(OH)_{6-a}Cl_a$$

wherein $a$ is a number from 0.8 to 2.0 and preferably has a value of 1. Generally, the zirconium-aluminum complexes within the scope of the present invention may be represented by the formula:

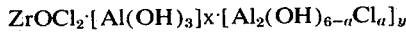

$$ZrOCl_2 \cdot [Al(OH)_3]x \cdot [Al_2(OH)_{6-a}Cl_a]_y$$

wherein $a$ is as defined above; $x$ is a number from 0.5 to 2.0 and preferably 1.0 to 1.75; and $y$ is a number from 0.25 to 6 and preferably from 0.25 to 2. Complexes in which $x$ is about 1.5 and $y$ is about 1.25 were found to be particularly useful.

Generally, the reaction of the aluminum hydroxide with the zirconyl chloride is carried out in an aqueous medium. As is known, aluminum hydroxide is practically insoluble in water. However, it has been found that through the reaction with the zirconyl chloride, it is solubilized and the reaction proceeds fairly readily. In preferred mode of carrying out the reaction, a slurry of the aluminum hydroxide in water is made, and it is combined with an aqueous solution of the zirconyl chloride. Generally, the reaction can be accelerated by moderate heating, e.g. up to 100°C and preferably at temperatures between 50° and 60°C. By heating to the preferred temperature range, it was found that the reaction is substantially complete in about an hour to an hour and a half. The resulting complex, which is water-soluble, is then reacted with the aluminum chlorhydroxide. Initially, the reaction composition becomes gelatinous; however, the gel may be broken by heating the composition to an elevated temperature, e.g. up to 100°C and preferably between 60° and 80°C, for periods of from an hour to an hour and one half. The resulting complex may be used in the solution in which it is produced to formulate anti-perspirant compositions or it can be recovered in powder form, e.g. by spray drying and then used in the various types of antiperspirant formulations which are commercially marketed, e.g. creams, sticks, roll-ons, and aerosols. Generally, the drying of the complex is carried out under conditions which will provide a free moisture content of about 0.5 to 3% and preferably about 1% and a bound water content of about 10 to 20% and preferably about 15%.

Generally, the complexes of the present invention in aqueous mediums have pH's falling within the range of 3.4 to 4.1. As is known, such pH's are quite desirable both from an efficacy standpoint as well as from a safety standpoint as to skin and clothing. If desired, the complexes may be further buffered by other materials such as urea and amino acids.

The complexes of the present invention were found to be particularly useful in aerosol anti-perspirant compositions of the type in which the active complex is suspended as a fine powder in a substantially anhydrous hydrophobic liquid carrier. Generally, such aerosol compositions comprise: (a) from about 1 to 15% of the complex; (b) about 0.1 to about 5.0% of a suspending agent such as colloidal silica, treated clays (e.g. the reaction product of bentonite and a cationic surface active agent), and high molecular weight aliphatic amines and amides, e.g. laurylamine and stearyl monoethanolamide; (c) about 1 to 15% of a hydrophobic liquid carrier such as fatty acid esters (e.g. isopropyl myristate and isopropyl palmitate), dibasic acid esters such as diethyl succinate, tribasic acid esters (e.g. triethyl citrate), mineral oils, alcohols (such as lauryl alcohol), fatty acids (such as stearic acid), and silicone oils (e.g. dimethylpolysiloxane); and (d) about 70 to 90% of a propellant such as monochlorodichloromethane, dichlorodifluoromethane, trichlorofluoromethane, dichlorotetrafluoroethane, trichlorotrifluoroethane, propane, butane, and combinations thereof.

The following non-limiting examples illustrate the preparation of complexes within the scope of the present invention.

EXAMPLE I

A complex in which the molar ratio of aluminum hydroxide to zirconyl chloride to aluminum chlorhydroxide reactants was about 1.5 to 1 to 1.25 was made by adding 10.53 parts of a 26.2% solution of zirconyl chloride ($ZrOCl_2$) to 81.44 parts of a 2.22% slurry of aluminum hydroxide [$Al(OH)_3$]. The resulting mixture was heated between 50° – 60°C for an hour to an hour and one half, until all of the aluminum hydroxide was consumed. 8.03 parts of a 41.0% solution of aluminum chlorhydroxide of the formula ($Al_2[OH]_5Cl$) was added, and the mass was heated at a temperature of 75° – 80°C for a period of an hour to an hour and one half, until it was no longer gelatinous. The resulting solution was cooled to ambient temperature and spray dried to a free-flowing powder, which, in turn, was ground to the desired particle size. The spray drying was carried out in a laboratory spray drier which had an inlet temperature of about 280°F, an outlet temperature of about 250°F and a feed rate of about 100 to 150 ml. per minute. The atomic ratio of aluminum to zirconium in the finished powder was about 4.1 to 1, and a 15% aqueous solution of it had a pH of 3.8. When 1,067 mg. of the product was extracted with 50 ml. of methanol, which is a solvent for the aluminum chlorhydroxide, only 3.7 mg. was removed, thus indicating that the product is a complex rather than a physical mixture.

The product produced in Example I was incorporated into an aerosol antiperspirant composition of the following formula:

| Ingredients | Parts by Weight |
|---|---|
| Aluminum-Zirconium Complex of Example I | 4.60 |
| Volatile Silicone Oil (carrier) | 0.95 |
| Triethyl Citrate (carrier) | 0.55 |
| Fumed Silica | 0.35 |
| Propellant | 93.55 |
| (30 parts dichlorodifluoromethane) | |
| (70 parts trichlorofluoromethane) | |
| (by weight) | |
| | 100.00 |

The above composition was tested, using a protocol similar to that disclosed by Fredell and Longfellow in the *Journal of the Society of Cosmetic Chemists*, Vol. 9(2), Page 108, 1958, on 24 female subjects against a commercial aerosol anti-perspirant composition, having a complex of aluminum chlorhydroxide, zirconylhydroxychloride, and glycine as the actives. Twenty-two hours after the fifth application, the percent sweat reductions were as follows:

| Product | Average % Sweat Reduction |
|---|---|
| Antiperspirant of Example I | 40.9 ± 8.2 |
| Commercial Antiperspirant | 39.5 ± 6.2 |

EXAMPLE 2

A complex was made up in a manner similar to that set forth in Example I except that the molar ratio of the aluminum hydroxide to zirconyl choride to aluminum chlorhydroxide reactants was 1 to 1 to 1. The atomic ratio of aluminum to zirconium in the product was about 3 to 1 and in water it had a pH of 3.8.

The complex produced in Example 2 was incorporated into an aerosol antiperspirant composition of the following formula:

| Ingredients | Parts by Weight |
|---|---|
| Aluminum-Zirconium Complex of Example 2 | 2.30 |
| Fumed Silica | 0.35 |
| Diethyl succinate | 5.75 |
| Propellant | 91.60 |
| (40 parts by weight dichloro-difluoromethane) | |
| (60 parts by weight trichloro-monofluoromethane) | |
| | 100.00 |

The above composition was tested against the same commercial antiperspirant as in Example I using a protocol similar to that used in Example I except that only four applications of the antiperspirants were made and the sweat reductions were measured 1 hour after the last application. The following results were obtained:

| Product | Average % Sweat Reduction |
|---|---|
| Antiperspirant of Example I | 26.0 ± 7.2 |
| Commercial Antiperspirant | 25.6 ± 7.2 |

Having thus described the invention, what is claimed is:

1. A process for making an aluminum-zirconium complex comprising reacting in an aqueous medium about 0.5 to 2 moles of aluminum hydroxide with 1 mole of zirconyl chloride to produce a complex, the resulting complex which is water soluble is then reacted with about 0.25 to 6 moles of an aluminum chlorhydroxide within the formula:

$$Al_2(OH)_{6-a}Cl_a$$

where $a$ is a number from 0.8 to 2.0 and thereafter the resulting composition is heated to an elevated temperature up to 100°C until the gel is broken.

2. A process as defined in claim 1, where $a$ is about 1.

3. A process as defined in claim 1, wherein about 1.5 moles of the aluminum hydroxide are employed and said resulting complex is further reacted with about 1.25 moles of the aluminum chlorhydroxide.

4. A process as defined in claim 2, wherein about 1.5 moles of the aluminum hydroxide are employed and said resulting complex is further reacted with about 1.25 moles of the aluminum chlorhydroxide.

5. A process as defined in claim 1, wherein about 1 mole of the aluminum hydroxide is employed and said resulting complex is further reacted with about 1 mole of the aluminum chlorhydroxide.

6. A process as defined in claim 2, wherein about 1 mole of the aluminum hydroxide is used and said resulting complex is further reacted with about 1 mole of aluminum chlorhydroxide.

7. A zirconium-aluminum complex selected from the group represented by the empiric formula:

$ZrOCl_2 \cdot [Al(OH)_3]_x \cdot [Al(OH)_{6-a}Cl_a]_y$ wherein $a$ is a number from 0.8 to 2.0, $x$ is a number from 0.5 to 2.0, and $y$ is a number from 0.25 to 6.

8. A complex as defined in claim 7, wherein $a$ is equal to about 1.

9. A complex as defined in claim 7, wherein $x$ is about 1.5 and $y$ is about 1.25.

10. A complex as defined in claim 8, wherein $x$ is about 1.5 and $y$ is about 1.25.

11. A complex as defined in claim 7, wherein both $x$ and $y$ are about 1.

12. A complex as defined in claim 8, wherein both $x$ and $y$ are about 1.

* * * * *